US010131822B2

(12) United States Patent
Casimiro et al.

(10) Patent No.: US 10,131,822 B2
(45) Date of Patent: Nov. 20, 2018

(54) PEELABLE ADHESIVE COMPOSITION

(71) Applicant: Bostik S.A.

(72) Inventors: Jessie Casimiro, Brie Comte Robert (FR); Eric Verscheure, Vernou la Celle sur Seine (FR)

(73) Assignee: BOSTIK S.A., La Plaine St. Denis (FR)

( * ) Notice: Subject to any disclaimer, the term of this patent is extended or adjusted under 35 U.S.C. 154(b) by 0 days.

(21) Appl. No.: 14/446,409

(22) Filed: Jul. 30, 2014

(65) Prior Publication Data
US 2014/0352887 A1 Dec. 4, 2014

Related U.S. Application Data

(62) Division of application No. 13/726,865, filed on Dec. 26, 2012, now abandoned.

(30) Foreign Application Priority Data

Dec. 26, 2011 (FR) ..................................... 11 62448

(51) Int. Cl.
| | | |
|---|---|---|
| *B32B 37/12* | (2006.01) | |
| *B32B 37/02* | (2006.01) | |
| *C09J 107/02* | (2006.01) | |
| *C09D 5/20* | (2006.01) | |
| *B05D 1/40* | (2006.01) | |
| *B05D 3/00* | (2006.01) | |
| *B32B 43/00* | (2006.01) | |
| *C08L 23/08* | (2006.01) | |
| *C08L 31/04* | (2006.01) | |
| *C08L 33/08* | (2006.01) | |
| *C08L 33/22* | (2006.01) | |
| *C08L 75/00* | (2006.01) | |

(52) U.S. Cl.
CPC .............. *C09J 107/02* (2013.01); *B05D 1/40* (2013.01); *B05D 3/007* (2013.01); *B32B 37/1284* (2013.01); *B32B 43/006* (2013.01); *C08L 23/0853* (2013.01); *C08L 31/04* (2013.01); *C08L 33/08* (2013.01); *C08L 33/22* (2013.01); *C08L 75/00* (2013.01); *C09D 5/20* (2013.01); *B32B 2305/188* (2013.01); *B32B 2305/20* (2013.01); *B32B 2367/00* (2013.01); *B32B 2375/00* (2013.01); *B32B 2419/04* (2013.01); *Y10T 156/11* (2015.01); *Y10T 156/1195* (2015.01)

(58) Field of Classification Search
CPC .............. B32B 37/1284; B32B 43/006; B32B 2305/188; B32B 2367/00; B32B 2375/00; B32B 2419/04
See application file for complete search history.

(56) References Cited

U.S. PATENT DOCUMENTS

| | | | | |
|---|---|---|---|---|
| 3,788,941 A | * | 1/1974 | Kuptis .................. | D06N 7/0071 156/247 |
| 4,230,753 A | * | 10/1980 | Sheyon .................. | C09J 7/0296 428/212 |
| 4,814,168 A | * | 3/1989 | Sablotsky ........... | A61F 13/0276 424/448 |
| 5,785,978 A | * | 7/1998 | Porter .................. | A61K 8/0208 424/401 |
| 5,804,215 A | * | 9/1998 | Cubbage ............... | B09B 3/0075 424/443 |
| 2002/0037977 A1 | * | 3/2002 | Feldstein ............. | A61K 9/7053 526/60 |
| 2009/0171258 A1 | | 7/2009 | Stroebeck et al. | |
| 2009/0258063 A1 | * | 10/2009 | Udagawa ............. | A61K 9/7061 424/449 |
| 2010/0120931 A1 | | 5/2010 | Zajaczkowski et al. | |
| 2011/0256395 A1 | * | 10/2011 | Zmarsly ................ | C09J 133/08 428/354 |

FOREIGN PATENT DOCUMENTS

| | | |
|---|---|---|
| CA | 2145244 B1 | 9/1996 |
| EP | 0155557 A1 | 9/1985 |

OTHER PUBLICATIONS

U.S. Office Action dated Dec. 15, 2014 for corresponding U.S. Appl. No. 13/726,865.
Search Report, dated May 2, 2012, issued in corresponding FR 1162448.

* cited by examiner

*Primary Examiner* — Karuna P Reddy
(74) *Attorney, Agent, or Firm* — Millen, White, Zelano & Branigan, PC

(57) ABSTRACT

The invention relates to an adhesive composition comprising at least one natural latex and at least one polymeric composition having a glass transition temperature ranging from −50° C. to 0° C. The invention also relates to a membrane obtained after drying the adhesive composition according to the invention, to a combination of a flexible surface coating with an adhesive composition according to the invention, to a method for applying a flexible surface coating onto a substrate as well as a substrate coated with a peelable adhesive membrane according to the invention.

13 Claims, 4 Drawing Sheets

PEELABLE ADHESIVE COMPOSITION

TECHNICAL FIELD

The present invention relates to a peelable adhesive composition. The invention also relates to a peelable membrane obtained by drying the adhesive composition according to the invention. The invention also relates to the combination of a surface coating with the peelable adhesive composition, and to a method for applying a surface coating. The invention also relates to a method for renovation of a surface coating.

STATE OF THE ART

The replacement of a flexible flooring is an operation which has been posing many problems to professionals and individuals for a long time.

There exist solutions for non-definitive attachment of the coating, either by using double sided adhesive strips or by using a fixing agent consisting of a self-adhesive. These solutions allow rapid renovation of the premises but they should be reserved for residential rooms with low passing frequency. Indeed, the resistance of the attachment and the durability of the adhesive bonding are low. Further, the use of double sided adhesive strips causes overthicknesses which may cause blisters upon displacements of furniture or generate the occurrence of traces on the PVC (called phantoms).

In the case of an attachment by means of conventional adhesives which is the common solution today, the replacement for renovation of a flexible flooring stuck beforehand (for example a fitted carpet), involves a succession of long and tedious steps before being able to restick a new coating. The old coatings have to be suppressed by pulling them off in a first phase, and then the adhesive residues have to be removed. One then resorts either to manual tools (scrapers) or to the aid of a stripper or a paint stripper with a solvent.

In the case of irregularities, it should further be proceeded with sanding as well as with filling the floor with a leveling plaster coat before being able to apply a new adhesive layer for attaching the new coating.

Further, some adhesive and potentially, residues of an inorganic binder such as a filler remain attached on the old coating, which is an obstacle to its recycling.

In the case of large surfaces such as commercial premises, the replacement of the coating will require closing the premises for a relatively long time required for the whole of the renovation steps.

This problem is also again found for walls, with coatings of the glass fabric type.

Document DE 10 029 964 describes an adhesive in an aqueous dispersion for flexible flooring, comprising a dispersion of acrylic polymers, a tackifying resin and a mineral filler. With this composition it is possible to cause easy breakage within the adhesive (cohesive failure) but this composition does not solve the problems related to the adhesive residues remaining on the substrate and which will have to be removed by means of a solvent or by particular mechanical tools. It does not either allow the recycling of the coating.

Document EP 0 911 463 describes a peelable coating comprising a durable upper layer and anti-adhesive sublayer (release coating). The durable layer is a layer of the epoxy resin type, therefore a hard layer or of the polyurethane type. The release layer has greater adhesion on the durable layer than on the support. Such layers are for example latex layers.

A barrier layer, e.g. based on wax, may also be provided instead and in place of the latex anti-adhesive layer.

Document U.S. Pat. No. 4,824,498 describes a surface coating comprising a succession of layers. A first non-peelable layer is attached onto the floor, a second peelable layer is applied onto the first layer and then a non-peelable cell layer is applied, finally the surface coating, generally a fitted carpet, is stuck onto the cell layer. This surface coating does not solve the problems related to the adhesive residues remaining on the substrate and does not either allow recycling of the coating.

Therefore to this day, there does no exist any simple, resistant, adhesive bonding solution and in particular a solution suitable for premises with a lot of traffic, which may subsequently be easily removed and rapidly in order to find again the original substrate for renovation on the one hand and optionally the original flexible coating for recycling on the other hand.

BRIEF DESCRIPTION OF THE INVENTION

The object of the present invention is to provide an adhesive composition overcoming at least partly the aforementioned drawbacks.

For this purpose, the present invention proposes an adhesive composition comprising:
from 10% to 40% by weight of at least one natural latex,
from 10% to 40% by weight of dry material based on the total weight of the adhesive composition, of at least one polymeric composition having a glass transition temperature ranging from −50° C. to 0° C., said polymeric composition comprising:
at least one copolymer or one mixture of at least two polymers comprising at least one (meth)acrylate or (meth)acrylic monomer, and/or
at least one mixture of at least two polymers comprising at least one polyester and at least one polyurethane, and/or
at least one copolymer of vinyl acetate and of ethylene.

According to an embodiment of the invention, the adhesive composition further comprises from 10% to 40% by weight of at least one filler having an apparent density ranging from 1.30 to 1.70.

According to an embodiment of the invention, the natural latex represents from 15% to 35%, preferably from 20% to 30% by weight of the total weight of the adhesive composition.

According to an embodiment of the invention, the polymeric composition represents from 10% to 25%, preferably from 12% to 20% by weight of dry material based on the total weight of the adhesive composition.

According to an embodiment of the invention, the filler(s) represent(s) from 15% to 35%, preferably from 20% to 30% by weight of the total weight of the composition.

According to an embodiment of the invention, the adhesive composition further comprises up to 10% by weight of a tackifying resin, preferably selected from rosin esters, terpene resins, terpene-phenol resins, dispersions based on terpene-phenol resin.

Preferably, the natural latex is a natural latex having an ammonia content ranging from 0.2 to 1% by weight based on the weight of natural latex.

According to an embodiment, the filler is a mineral filler, preferably selected from calcium carbonate, magnesium carbonate, sand, alumina, hydrated alumina, magnesium silicate, aluminium silicate, sodium silicate, potassium silicate, mica and silica.

Preferably, the polymeric composition has a glass transition temperature ranging from −40° C. to −10° C., preferably from −37° C. to −15° C.

According to an embodiment of the invention, the copolymer is a terpolymer of vinyl acetate, of ethylene and of acrylate.

According to an embodiment, the polymeric composition comprises a terpolymer of vinyl acetate, of ethylene and of acrylate and a mixture of a polyester and of a polyurethane.

According to an embodiment of the invention, the adhesive composition further comprises fibers, preferably cellulose or glass fibers or natural fibers, such as cotton, jute, viscose, sisal, or synthetic fibers, such as polyamide, polyester, polyacrylonitrile, polypropylene, polyethylene, or rubber fibers.

The invention also relates to a membrane obtained by drying the adhesive composition according to the invention.

The invention also relates to the combination of a flexible surface coating with an adhesive composition according to the invention.

The invention also relates to a method for applying a flexible surface coating on a substrate comprising the following steps:
a) applying an adhesive composition layer according to the invention onto a substrate,
b) displaying the flexible coating on the substrate, Preferably, the amount of applied adhesive composition is greater than or equal to 200 g/m$^2$, preferably greater than or equal to 250 g/m$^2$, still preferably greater than or equal to 300 g/m$^2$, more particularly greater than or equal to 350 g/m$^2$.

According to an embodiment of the invention, the application method according to the invention comprises before step a), a step for applying a weft or a non-woven reinforcing strip onto the substrate.

Preferably, the weft is selected from a grid, a woven or non-woven material.

According to an embodiment of the invention, the application method comprises between steps a) and b), an additional step for drying the adhesive composition so as to obtain a membrane, followed by the application of an adhesive composition, different from that of the invention, onto the thereby obtained membrane.

According to an embodiment of the invention, the application method comprises a subsequent step for smoothing the adhesive composition under the flexible surface coating.

The invention also relates to a substrate coated with a peelable adhesive membrane and with a flexible surface coating.

Preferably, the peelable adhesive membrane has a thickness greater than or equal to 100 µm, preferably greater than or equal to 125 µm, more particularly greater than or equal to 150 µm.

According to an embodiment of the invention, the peelable adhesive membrane has a thickness of less than or equal to 1 millimeter.

The invention also relates to a method for renovation of a substrate according to the invention comprising a step for pulling off the flexible surface coating.

According to an embodiment of the invention, the renovation method comprises an additional step for recycling the flexible surface coating.

The advantages of the present invention are the following:
The composition of the invention is an adhesive bonding composition which after drying forms a film, also called a membrane, which is peelable. With a single composition, it is therefore possible to ensure adhesive bonding and subsequent detachment of the coating, the composition of the invention after drying allows easy separation of the flexible coating from the substrate, while leaving the support and the coating intact with practically no adhesive residue, the adhesive composition of the invention provides long-lasting adhesive bonding suitable for premises with strong traffic, the adhesive composition of the invention is also well adapted to application onto floors as well as to walls, the method for applying the surface coating of the invention is simple to apply since it only requires the application of a single adhesive layer, the method for adhesive bonding of the surface coating according to the invention does not require the use of several coatings, one of which would remain to the floor on a long term basis, the adhesive bonding method of the invention allows adhesion of all types of coatings, even those requiring the use of a strong adhesive, while allowing a floor to be preserved without any adhesive residue upon removing the coating, the coating and the peelable adhesive of the invention may be removed manually, without requiring the use of tools of the scraper type. The film stemming from the drying of the adhesive composition may be removed from the substrate or from the coating without using any chemical products and without having to resort to particular mechanical tooling, with the invention, it is possible to recycle the coating, after detachment and withdrawal of the peelable film, the latter being without any adhesive residue.

Other features and advantages of the invention will become apparent on reading the description which follows, of a preferred embodiment of the invention, given as an example and with reference to the appended drawings.

DETAILED DESCRIPTION OF THE INVENTION

Figure 1:
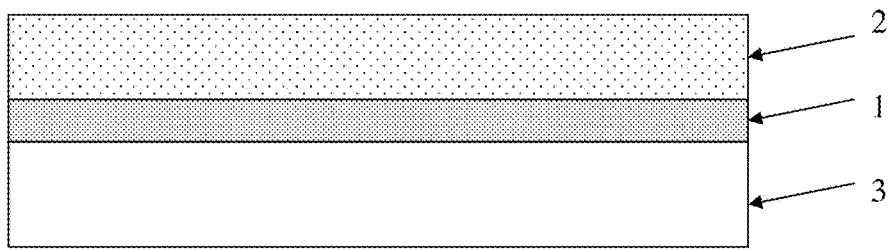
FIG. 1 is a diagram illustrating an embodiment of the invention after application of the peelable adhesive (1) and of the flexible coating (2) on a substrate (3).

The present invention proposes a peelable adhesive composition comprising:
from 10% to 40% by weight of at least one natural latex, and
from 10 to 40% by weight of dry material based on the total weight of the adhesive composition, of at least one polymeric composition having a glass transition temperature ranging from −50° C. to 0° C., said polymeric composition comprising:
at least one copolymer or one mixture of at least two polymers comprising at least one (meth)acrylate or (meth)acrylic monomer, and/or at least one mixture of at least two polymers comprising at least one polyester and at least one polyurethane, and/or at least one copolymer of vinyl acetate and of ethylene.

According to an embodiment of the invention, the adhesive composition according to the invention further comprises from 10% to 40% by weight of at least one filler having an apparent density ranging from 1.30 to 1.70.

By peelable adhesive composition is meant an adhesive composition which after application on a substrate and drying forms a film or membrane, which may easily be removed without leaving any residues.

According to the present invention, the natural latex may be a natural latex of a standard grade, a natural latex having a low ammonia content, a natural latex having a strong ammonia content. Generally, water represents from 30% to 45% of the natural latex weight, typically 38.5% of the natural latex weight. Preferably, the natural latex is a natural latex having an ammonia content ranging from 0.2 to 1% by weight based on the weight of natural latex. A natural latex may be selected, having a low ammonia content, i.e. generally ranging from 0.2% to 0.4%, typically 0.29% by weight based on the natural latex weight, or else a natural latex having a strong ammonia content, i.e. generally ranging from 0.5 to 1% by weight based on the weight of natural latex. It is well known to one skilled in the art that ammonia allows stabilization of natural latex.

The copolymers or the polymers used in the invention for forming the polymeric composition, may be in the form of an aqueous emulsion or in the form of a redispersible powder, which, after adding water, forms an aqueous solution. The form in which the copolymer or the mixture of polymers is used depends on its solubility in water.

The apparent density is measured by conventional methods well known to one skilled in the art, for example by weighing a determined volume as described in the experimental part of the present invention. The apparent density is defined by the ratio between the mass of the material and the apparent volume of the whole of the grains.

The presence of the filler allows control and enlargement of the thickness of the peelable adhesive film without increasing its cost. A larger thickness increases the cohesion of the film and facilitates its removal after drying.

According to an embodiment of the present invention, the filler is a mineral filler. Preferably, the filler is selected from calcium carbonate, magnesium carbonate, sand, alumina, hydrated alumina, magnesium silicate, aluminium silicate, sodium silicate, potassium silicate, mica and silica. More particularly, the filler is selected from calcium carbonate and sand.

It is also possible to contemplate the use of one or several organic fillers alone or in correlation with one or several mineral fillers.

According to an embodiment, natural latex represents from 15% to 35% by weight of the total weight of the adhesive composition, preferably from 20% to 30% by weight of the total weight of the adhesive composition.

According to an embodiment, the polymeric composition represents from 10% to 25% by weight, of dry material based on the total weight of the adhesive composition, preferably from 12% to 20% by weight of dry material based on the total weight of the adhesive composition.

According to an embodiment, the ratio (m/m) between the mass of natural latex (wet mass) and the polymeric composition mass (dry material) ranges from 0.5 to 5, preferably from 1.2 to 2.5, is typically equal to about 2.

According to an embodiment, the filler(s) represent(s) from 15 to 35% by weight of the total weight of the adhesive composition, preferably from 20% to 30% by weight of the total weight of the adhesive composition.

In the adhesive composition, water is brought by the natural latex, through the aqueous emulsion of copolymer or of a mixture of polymers and with optional addition of water. Indeed, depending on the dilution of the copolymer or of the mixture of polymers, one may be lead to adding water for obtaining the desired active material concentration.

According to an embodiment, water represents from 20% to 60% by weight of the total weight of the adhesive composition, preferably from 20% to 50% by weight of the total weight of the adhesive composition.

According to an embodiment of the invention, the peelable adhesive composition comprises one or several other additives selected from: a thickener, a biocide, an anti-foam agent, a natural latex stabilizer, an odor-masking agent, a pH-adjusting agent and/or an antioxidant.

The thickener notably gives the possibility of maintaining the filler(s) in suspension.

Preferably, the thickener is an aqueous solution of sodium polyacrylate or an aqueous solution of polyurethane. Generally, the thickener has a glass transition temperature of the order of 200° C., much higher than the glass transition temperatures of the copolymers or of the mixtures of polymers as defined earlier.

Preferably, the thickener represents from 0.2 to 5%, preferably from 0.5% to 5% by weight of the total weight of the adhesive composition.

Preferably, the other additives represent from 0.5% to 5% by weight of the total weight of the adhesive composition.

Preferably, the polymeric composition has a glass transition temperature (Tg) ranging from −40° C. to −10° C., more particularly from −37° C. to −15° C. In a conventional way, well known to one skilled in the art, the glass transition temperature may be measured by DSC (Differential Scanning calorimetry).

By copolymer, comprising at least one (meth)acrylate or (meth)acrylic monomer, is meant a polymer formed from at least two monomers, including a (meth)acrylate or (meth)acrylic monomer.

By mixture of polymers comprising at least one (meth)acrylate or (meth)acrylic monomer, is meant a mixture comprising at least two polymers, at least one polymer of which is formed from (meth)acrylate or (meth)acrylic monomers.

According to an embodiment, the (meth)acrylate or (meth)acrylic monomer is selected from acrylic acid, methacrylic acid, methyl acrylate, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacryalte, stearyl acrylate, stearyl methacrylate, glycidyl methacrylate, acrylamide, methacrylamide, hydroxethyl acrylate, hydroxyethyl methacrylate, allyl methacrylate, cyclohexyl acrylate, cyclohexyl methacrylate, 2-ethoxyethyl-acrylate, 2-ethoxyethyl-methacrylate, isodecyl acrylate, isodecyl methacrylate, 2-methoxy acrylate, 2-ethoxy-methacrylate, 2-(2-ethoxyethoxy)-ethyl acrylate, 2-phenoxyethyl acrylate, 2-phenoxyethyl methacrylate, isobornyl acrylate, isobornyl methacrylate, caprolactone acrylate, caprolactone methacrylate, polypropylene glycol monoacrylate, polypropylene glycol monomethacrylate, polyethylene glycol acrylate, polyethylene methacrylate, benzyl acrylate, benzyl methacrylate.

According to a particular embodiment of the invention, the polymeric composition having a glass transition temperature ranging from −50° C. to 0° C., comprises at least one copolymer or one mixture of at least two polymers comprising at least one (meth)acrylate or (meth)acrylic monomer.

According to a particular embodiment of the invention, the polymeric composition having a glass transition temperature ranging from −50° C. to 0° C., essentially consists in one or several copolymers or a mixture of at least two polymers comprising at least one (meth)acrylate or (meth)acrylic monomer.

According to an embodiment, the copolymer or the mixture of polymers comprising at least one (meth)acrylate or (meth)acrylic monomer comprises one or several other monomers selected from vinyl acetate, ethylene, styrene, vinyl chloride, vinyl versatate and vinyl laurate.

According to an embodiment, the copolymer comprising at least one (meth)acrylate or (meth)acrylic monomer is a terpolymer of vinyl acetate, of ethylene and of acrylate.

According to an embodiment of the invention, the polymeric composition having a glass transition temperature ranging from −50° C. to 0° C. comprises at least one mixture of two polymers comprising at least one polyester and at least one polyurethane.

Preferably, the polymeric composition essentially consists in a mixture of polyesters and of polyurethanes.

According to an embodiment, the polyurethanes are obtained from at least one polyol and at least one polyisocyanate.

Advantageously, the polyols are selected from ethylene glycol, 1,2-propylene glycol, 1,3-propylene glycol, 1,4-butanediol, 1,3-butanediol, 1,4-butenediol, 1,4-butynediol, 1,5-pentanediol, 1,6-hexanediol, 1,8-octanediol, neopentylglycol, cyclohexanedimethanol, 2-methyl-1,3-propanediol, 1,5-pentanediol, diethylene glycol, triethylene glycol, tetraethylene glycol, polyethylene glycol, dipropylene glycol, polypropylene glycol, dibutylene glycol and polybutylene glycol.

Preferably, the polyisocyanates are selected from linear or branched diisocyanates comprising an alkylene chain from 4 to 14 carbon atoms, cycloaliphatic diisocyanates comprising from 6 to 12 carbon atoms, aromatic diisocyanates comprising from 8 to 14 carbon atoms, polyisocyanates comprising isocyanurates, uretdione diisocyanates, diisocyanates comprising biurets, polyisocyanates comprising urethane and/or allophanate groups, polyisocyanates comprising oxadiazinetrione groups, uretonimine-modified polyisocyanates or mixtures thereof.

According to an embodiment, the diisocyanates are selected from tetramethylene diisocyanate, hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, 1,4-diisocyanatocyclohexane, 1,3-diisocyanatocyclohexane, 1,2-diisocyanato-cyclohexane, 4,4'-di(isocyanatocyclohexyl)methane, 1,4-diisocyanatocyclohexene, 1,3-diisocyanatocyclohexene, 1,2-diisocyanatocyclohexene, isophorone diisocyanate (IPDI), 2,4-diisocyanato-1-methylcyclohexane, 2,6-diisocyanato-1-methyl-cyclohexane, 2,4-diisocyanatotoluene, 2,6-diisocyanatotoluene, tetramethylxylylene diisocyanate, 1,4-diisocyanatobenzene, 4,4'-diisocyanatodiphenylmethane, 2,4-diisocyanatodiphenylmethane, p-xylylene diisocyanate and isopropenyl-dimethyltolylene diisocyanate.

According to an embodiment, the polyesters are selected from polyol polyesters. Preferably, the polyesters are obtained from polycarboxylic acids and/or polycarboxylic anhydrides and/or polycarboxylates and polyols.

The polycarboxylic acids may be aliphatic, cycloaliphatic, aromatic or heterocyclic, they may be non-substituted or substituted, for example with a halogen, and they may be saturated or unsaturated.

According to an embodiment, the polycarboxylic acids, the polycarboxylic anhydrides are selected from succinic acid, adipic acid, suberic acid, azelaic acid, sebacic acid, phthalic acid, isophthalic acid, phthalic anhydride, tetrahydrophthalic anhydride, hexahydrophthalic anhydride, tetrachlorophthalic anhydride, endomethylenetetrahydrophtalic anhydride, glutaric anhydride, maleic acid, maleic anhydride, fumaric acid.

Among the polyols which may be used for making the polyester, mention may be made of ethylene glycol, 1,2-propylene glycol, 1,3-propylene glycol, 1,4-butanediol, 1,3-butanediol, 1,4-butenediol, 1,4-butynediol, 1,5-pentanediol, 1,6-hexanediol, 1,8-octanediol, neopentylglycol, cyclohexanedimethanol, 2-methyl-1,3-propanediol, 1,5-pentanediol, diethylene glycol, triethylene glycol, tetraethylene glycol, polyethylene glycol, dipropylene glycol, polypropylene glycol, dibutylene glycol and polybutylene glycol.

According to an embodiment of the invention, the polymeric composition having a glass transition temperature ranging from −50° C. to 0° C. comprises at least one copolymer of vinyl acetate and of ethylene.

According to an embodiment of the invention, the polymeric composition having a glass transition temperature ranging from −50° C. to 0° C. comprises a mixture:
  of at least one copolymer or one mixture of at least two polymers comprising at least one (meth)acrylate or (meth)acrylic monomer as defined above, and
  of at least one mixture of at least two polymers comprising at least one polyester and at least one polyurethane as defined above.

According to an embodiment of the invention, the polymeric composition having a glass transition temperature ranging from −50° C. to 0° C. essentially consists in a mixture:
  of one or several copolymers or a mixture of at least two polymers comprising at least one (meth)acrylate or (meth)acrylic monomer as defined above, and
  a mixture of at least one polyester and of at least one polyurethane as defined above.

According to an embodiment, the fillers have an apparent density ranging from 1.30 to 1.70, preferably from 1.40 to 1.60.

Preferably, the filler has a grain size ranging from 10 to 400 μm.

One skilled in the art may adjust the proportions and the selection of the monomers so as to obtain a copolymer or a mixture of polymers having the desired glass transition temperature.

The emulsions of (co) polymer(s) which may be used for preparing the adhesive composition of the invention are commercially available. Mention may be made of the following products:
  PLEXTOL® D 306 (available from Synthomer): aqueous dispersion of pure acrylic resin based on n-butyl acrylate (98%) and on styrene (2%) having a glass transition temperature of −30° C.,
  VINNAPAS® EAF 68 (available from Wacker): aqueous dispersion of acrylic resin based on vinyl acetate, ethylene and acrylate having a glass transition temperature of −35° C., ACRONAL® A 380 (available from BASF): aqueous dispersion of acrylic resin based on acrylate(s) and on acrylonitrile having a glass transition temperature of −22° C., LUPHEN® D DS 3548 (available from BASF): a dispersion of a resin based on ester and urethane having a glass transition temperature of −46° C., VINNAPAS® EP 8010: an aqueous dispersion of resin based on vinyl acetate (83%) and on ethylene (17%) having a glass transition temperature of −10° C.

According to an embodiment of the invention, the peelable adhesive composition further comprises fibers, such as cellulose fibers, glass fibers, rubber fibers, natural fibers such as cotton, viscose, jute, sisal or synthetic fibers, such as polyamide, polyester, polyacrylonitrile, polypropylene, polyethylene fibers. Preferably the fibers represent from 0.01 to 2% by weight based on the weight of the peelable adhesive composition.

The fibers give the possibility after drying the composition of increasing the cohesion of the thereby obtained membrane (or film).

According to an embodiment of the invention, the adhesive composition further comprises up to 10% by weight of a tackifying resin, preferably selected from rosin esters, terpene resins, terpene phenol resins and dispersions based on terpene phenol resin.

The tackifying resin allows an improvement in the trapping nature of the adhesive. With this it is possible to maintain the materials better together as soon as they are assembled so that they do not slip and move relatively to each other. Thus, the adhesive film remains continuous and immobile during the setting time and the adhesive bonding does not open.

Another object of the present invention is a method for manufacturing the peelable adhesive according to the invention. The peelable adhesive is made by simply mixing the components. Preferably, the thickener is added first, followed by the soda solution, and then the copolymer or a mixture of polymers is added so as to avoid too large pH variations. After manufacture, the adhesive composition is stored away from light and air at a temperature ranging from 5° C. to 40° C., preferably from 10° C. to 30° C.

In the case when the copolymer of the mixture of polymers is in the form of a redispersible powder, the copolymer or the mixture of polymers is integrated to the adhesive composition by an extra addition of water in order to obtain an aqueous solution.

Another object of the present invention relates to a membrane obtained by drying the peelable adhesive composition according to the invention.

Indeed, the peelable adhesive composition according to the invention may be applied on a substrate, for example the floor, and then after drying said adhesive composition, the latter forms a peelable membrane.

According to an embodiment, the peelable membrane has a thickness greater than or equal to 100 μm, preferably greater than or equal to 125 μm, more particularly greater than or equal to 150 μm. One skilled in the art knows how to adapt the maximum thickness according to the application conditions. Indeed, it is desirable not to have a too large thickness for a surface coating stuck on a substrate. More particularly, the thickness of the peelable membrane (or film) may be less than or equal to 1 millimeter.

According to an embodiment of the invention, the peelable membrane may be obtained by applying the peelable adhesive composition according to the invention on a weft or a non-woven reinforcing strip.

Preferably, the weft is in the form of a grid, of a woven or non-woven material.

The material forming the weft may be a metal, natural or synthetic fibers or a plastic or in the form of a non-woven reinforcing strip.

Mention may for example be made of a weft in glass fiber, in polyamide, a metal grid, a non-woven material obtained by melting of entangled polypropylene fibers, a woven material of polyester.

According to an embodiment, a coating is directly applied on the peelable membrane. In this case, the substrate and the coating may be detached and may have after detachment, intact surfaces, i.e. without any adhesive residue after removing the coating.

In the case when a weft is used, the removal of the membrane from the coating surface and from the surface of the substrate is facilitated.

According to an alternative of the invention, a conventional adhesive is applied on a dry membrane as described above, for then applying a coating. In this case, during the removal of the coating, the substrate is found again intact, without any adhesive residue. This embodiment in particular gives the possibility of sticking coatings which require a strong adhesive. Among these types of coatings, mention may be made of the coatings having a large dimensional variation like rubber or LVT (Luxury Vinyl Tile) strips and slabs. In this embodiment, the adhesive membrane may either comprise a weft or not as described above.

Among conventional adhesives, mention may be made of acrylic or SBR (styrene-butadiene) dispersions or an adhesive of the resin-alcohol type or a liquid adhesive or dry adhesives.

Another object of the present invention is the combination of a flexible surface coating with a peelable adhesive composition according to the invention.

Indeed, it may make sense to associate within a kit intended for professionals or individuals, a flexible surface coating and an adhesive composition in amounts adapted to the surface to be coated.

A weft may also be part of the kit.

The kit may further comprise a conventional adhesive.

The flexible surface coatings used in the invention are those which meet the conditions set out in the DTU 53.1 and 53.2 standards.

Notably, flexible coatings are knitted, tufted, woven and flocked fitted carpets, in roll forms or as slabs, notably those which meet the requirements of NF EN 1307, as well as needled floorings in roll form or as slabs, notably those which meet the requirements of NF EN 1470 and prEN 13297. Mention may be made of conventional wool or synthetic fitted carpets, and natural fiber coatings.

Flexible coatings may also be polymer floorings, for example in PVC or other polymer. Mention may be made of the following examples (see the DTU 53.2 standard):

Homogeneous and heterogeneous floorings based on polyvinyl chloride

Floorings based on polyvinyl chloride on a jute or polyester support or on a polyester support with a backside in polyvinyl chloride Floorings based on polyvinyl chloride on foam Floorings based on polyvinyl chloride with a support based on cork Floorings based on expansed polyvinyl chloride Semi-flexible slabs based on polyvinyl chloride Slabs of cork agglomerate with a wear layer based on polyvinyl chloride Flexible coatings based on polymers of renewable origin (notably of agricultural origin) such as PLA (polylactic acid) or polyolefin polymers (the olefin notably stemming from bio-ethanol)

A large number of different coatings may therefore be used in the invention, for example the following coatings:
- homogeneous PVCs (slabs or strips)
- multilayer PVCs (slabs or strips)
- PVCs on cork
- Polyolefins
- Linoleums in strips
- Rubbers as slabs or as strips
- Expanded relief vinyls (ERV)
- Semi-flexible slabs
- Needled fabrics with or without any backside
- Fitted carpets on foam (latex)
- Fitted carpets with non-woven backsides
- Synthetic back fitted carpets (of the Action Back type)
- Coconut, sisal and sea grass with latex backsides.

Another object of the invention relates to a method for applying a flexible surface coating on a substrate comprising the following steps:
a) applying a peelable adhesive composition layer according to the invention onto the substrate,
b) displaying the flexible surface coating on the substrate.

The substrate on which the coating of the invention is applied is any traditional support receiving this type of coating. Mention may for example be made of surfaced concretes (notably with a treated siding), cement-based screeds (either incorporated or added), anhydrite screeds, old tilings, old suitably smoothed parquet flooring, particle panels or plywoods, standard wall claddings.

According to an embodiment of the invention, the amount of peelable adhesive composition is greater than or equal to 200 $g/m^2$, preferably greater than or equal to 250 $g/m^2$, more preferably greater than or equal to 300 $g/m^2$, more particularly greater than or equal to 350 $g/m^2$.

The application of the peelable adhesive composition is either carried out continuously or discontinuously on the substrate.

Preferably, the adhesive layer is directly applied on the substrate. The substrate is not generally primarized before applying the adhesive layer. For example tiling undergoes simple cleansing before applying the adhesive layer. The substrates are those mentioned in the DTU 53.1 standard.

Conventionally, the flexible surface coating is laid after observance of a gumming time ranging from 10 to 30 minutes. The gumming time corresponds to the period during which the applied adhesive composition thickens and increases its adhesive power.

Preferably, the application method of the invention has an additional step c) for smoothing the adhesive composition under the flexible surface coating in order to facilitate the transfer of the adhesive to the back of the flexible coating. With this step, it is notably possible to spread out the adhesive composition so as to make the applied adhesive composition continuous or quasi-continuous on the substrate.

The user may lay the flexible coating within a time interval defined by the working time which is of the order of 30 minutes and which may be modulated by adding additives. The working time begins to elapse at the end of the gumming time and ends at the moment when the adhesive has lost its adhesivity.

After drying the adhesive composition, a film (also called membrane) of peelable adhesive is obtained.

According to an embodiment, the peelable adhesive film or membrane has a thickness greater than or equal to 100 µm, preferably greater than or equal to 125 µm, more particularly greater than or equal to 150 µm. One skilled in the art knows how to adapt the maximum thickness according to the application conditions. Indeed, it is desirable not to have a too large thickness for a surface coating stuck onto a substrate. More particularly, the thickness of the peelable adhesive film may be less than or equal to 1 millimeter.

The invention preferentially applies to floorings, but also may be applied on walls.

According to a particular embodiment of the method for applying a flexible surface coating according to the invention, a weft is deposited on the substrate before step a) for applying the peelable adhesive composition layer.

Preferably, the weft is in the form of a grid, of a woven or non-woven material or of a non-woven reinforcing strip.

The material making up the weft may be a metal, natural or synthetic fibers or a plastic.

For example, mention may be made of a weft in glass fiber, in polyamide, metal grid, a non-woven material obtained by melting entangled polypropylene fibers, a woven polyester material.

FIG. 3 illustrates a particular embodiment of the invention. FIG. 3A illustrates as a perspective the initial substrate 3. FIG. 3B illustrates as a perspective the substrate 3 on which a weft 5 is deposited. FIG. 3C illustrates as a perspective the substrate 3 covered by the weft 5 onto which the adhesive composition 1 is applied by means of an applicator 6. FIG. 3D illustrates as a sectional view, the substrate 3 covered with the adhesive composition 1. The weft 5 is then impregnated with the adhesive composition 1. And then, a flexible coating 2 is applied on the adhesive composition 1 comprising the weft 5, as illustrated in FIG. 3E.

According to an alternative of the method according to the invention, the method for applying a flexible surface coating comprises between steps a) and b), the following additional steps:
Abis) drying the adhesive composition for obtaining a membrane,
Ater) application of a conventional adhesive on the membrane obtained at the end of step Abis.

Preferably, the application of the conventional adhesive in step Ater) is carried out after a drying time in step Abis) comprised between 20 and 80 minutes.

FIG. 4 illustrates an embodiment of the invention involving a conventional adhesive 7.

Figure 4A:
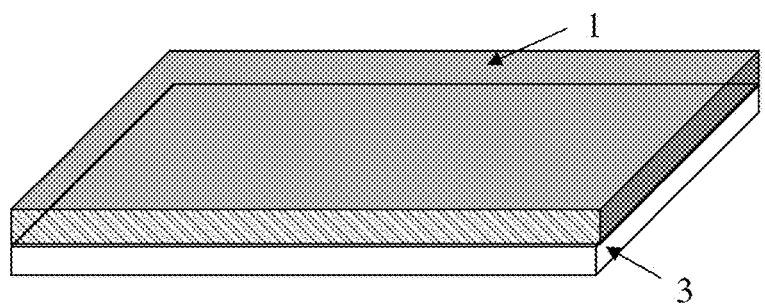
FIGS. 4A-4D are diagrams illustrating methods for adhesive bonding of a flexible coating (2) in which a conventional adhesive (7) is applied on the adhesive membrane (1).
Figure 4B:
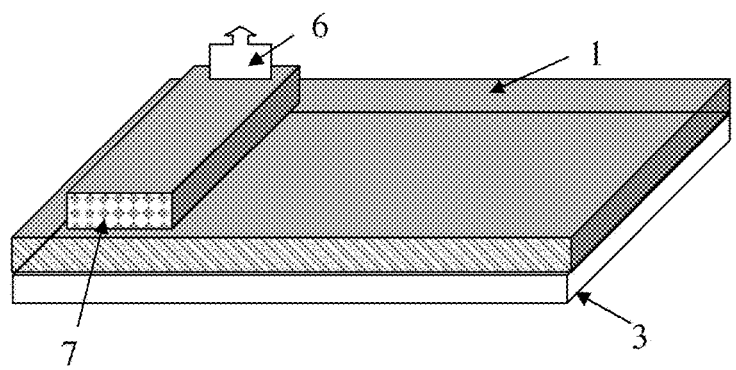
Figure 4C:
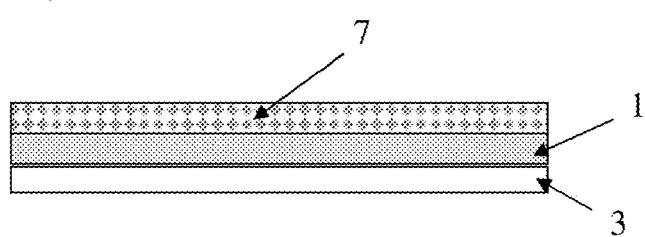
Figure 4D:
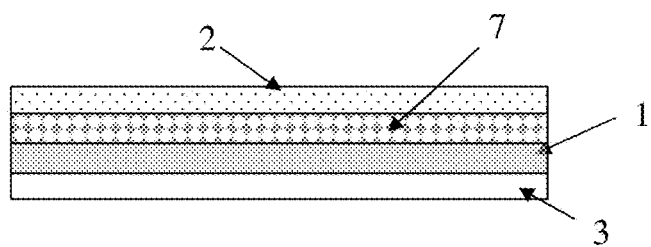

FIG. 4A illustrates as a perspective view, the substrate 3 coated with an adhesive membrane 1. FIG. 4B illustrates as a perspective view, the substrate 3 coated with a dry adhesive membrane 1 onto which a conventional adhesive composition 7 is applied by means of an applicator 6. FIG. 4C illustrates as a sectional view the substrate 3 covered with an adhesive membrane according to the invention and with a conventional adhesive composition layer 7. Next, a flexible coating 2 is applied on the conventional adhesive composition 7, as illustrated in FIG. 4D.

According to an alternative of the invention, the adhesive membrane 1 may comprise a weft, not illustrated in FIGS. 4A to 4D, as described above.

According to an embodiment of the invention, the conventional adhesive is selected from acrylic or SBR (styrene-butadiene) dispersions or adhesives of the resin-alcohol type or liquid adhesives or dry adhesives.

Another object of the present invention is a substrate coated with a peelable film according to the invention and with the flexible surface coating.

FIG. 1 illustrates the flexible coating 2 adhered on a substrate 3 by means of the peelable adhesive 1 according to the invention.

Another object of the present invention is a method for renovation of a substrate including a surface coating, this method comprising a step for pulling off a flexible coating according to the invention.

The pulling-off step is carried out by exerting a peeling force on the coating so as to remove easily the layer formed by the peelable adhesive film at the peelable film/substrate and peelable film/flexible coating interface, leaving the substrate and the flexible facing as they were before the adhesive bonding.

In the case when a conventional adhesive is applied between the coating and the peelable membrane according to the invention, then only the substrate is again found as it was before the adhesive bonding, at the end of the step for pulling off the flexible coating.

Figure 2:
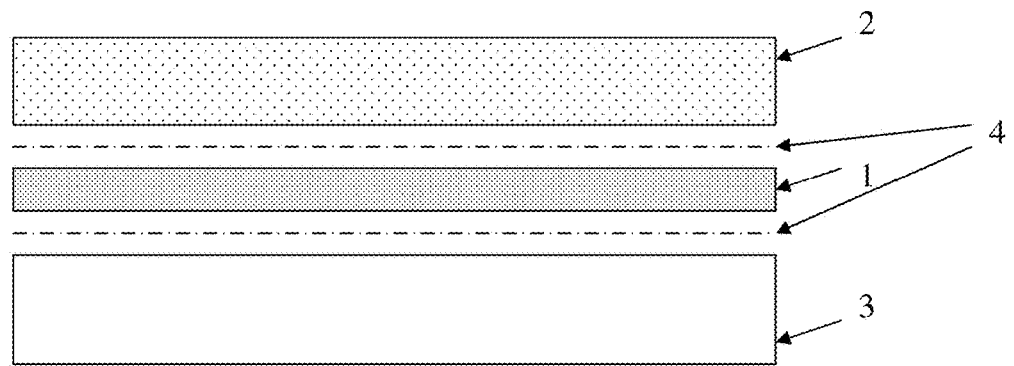
FIG. 2 is a diagram illustrating the condition of the substrate (3) and of the flexible coating (2) after renovation.
Figure 3A:
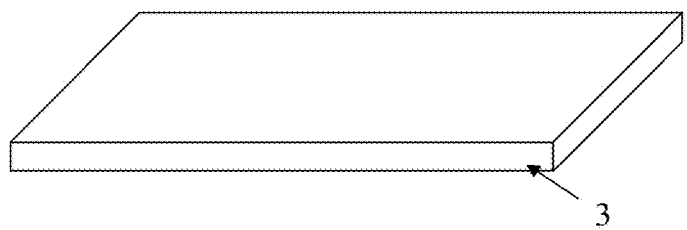
FIGS. 3A-3E are diagrams illustrating methods for adhesive bonding of a flexible coating (2) involving a weft or a non-woven reinforcing strip (5).
Figure 3B:
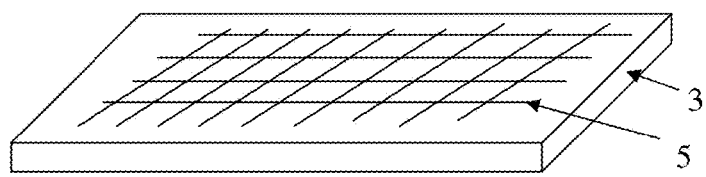
Figure 3C:
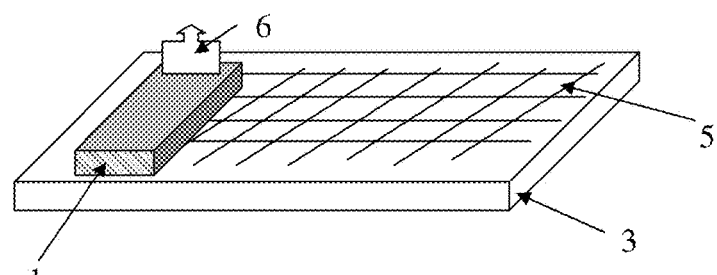
Figure 3D:
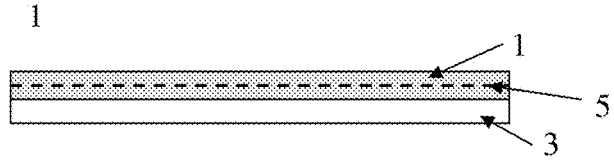
Figure 3E:
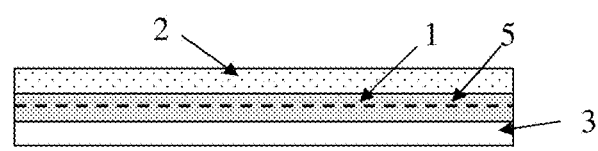

The renovation method according to an embodiment of the invention gives the possibility of obtaining a substrate and a flexible coating, both without any adhesive residues (FIG. 2). The failure, schematized in FIG. 2 by the lines 4, is adhesive.

According to an embodiment of the invention, the renovation method comprises an additional step for recycling the flexible coating.

After pulling off the flexible coating, the substrate may immediately be covered with a new coating and the coating may be recycled.

Examples

Different adhesive compositions were prepared and the performances of these compositions were tested.

The compositions A, B, C, D and E are comparative examples and are not part of the invention.

Compositions 1 to 15 are peelable adhesive compositions according to the invention.

The following copolymers were used:

PLEXTOL® D306: Aqueous dispersion of pure acrylic acid based on n-butyl acrylate (98%) and on styrene (2%) with Tg=−30° C., VINNAPAS® EAF 68: Aqueous dispersion of acrylic resin based on vinyl acetate, ethylene and acrylate with Tg=−35° C., ACRONAL® A380: Aqueous dispersion of acrylic resin based on acrylate(s) and on acrylonitrile with Tg=−22° C., VINNAPAS® EP34: Aqueous dispersion of resin based on vinyl acetate (87%) and on ethylene (13%) with Tg=3° C., LUPHEN® D DS 3548 (available from BASF): dispersion of a resin based on ester and urethane having a glass transition temperature of −46° C., VINNAPAS® EP 8010: Aqueous dispersion of resin based on vinyl acetate (83%) and on ethylene (17%) with Tg=−10° C.

The tackifying resin which was used for making the compositions 10 and 11 is a tackifying resin of the modified rosin type, esterified with triethylene glycol available from DRT under the designation GRANOLITE® 150 N.

The apparent density of the fillers was measured according to the following operating method:

- a calibrated cup with a capacity of about V=500 mL (mass of the cup Mo=500 g) is placed in an upright position below a funnel in stainless steel with a capacity of about 600 mL;
- the hollow bottom of the funnel is closed with a slider, the slider giving the possibility of ensuring the opening and the closing of the hollow bottom of the funnel;
- the funnel is filled completely with the homogenized filler(s), and the slider is rapidly removed, thereby letting the filler(s) flow into the cup;
- the excess fillers are slowly leveled by means of a flat ruler (an equivalent instrument may be suitable), and the outside of the cup is carefully cleaned with a dry cloth (a brush may be used),
- the cup is laid on analytical scales to within 0.1 g and the cup and its contents mass M1 are weighed with an accuracy of 0.1 g.

The apparent density is then calculated as being: d=(M1−Mo)/V. In this formula M1 and Mo are expressed in grams, the volume is expressed in $cm^3$.

TABLE 1

| Composition (% by weight) | A | B | C | D | E | 1 | 2 | 3 | 4 | 5 | 6 | 7 | 8 | 9 |
|---|---|---|---|---|---|---|---|---|---|---|---|---|---|---|
| PLEXTOL ® D306 (% by dry weight) | 60 | — | — | — | — | — | — | — | — | — | — | — | — | 30 |
| VINNAPAS ® EAF 68 (% by dry weight) | — | — | — | 6 | 19.3 | 15 | 15 | 15 | 15 | 15 | 30 | 30 | — | — |
| ACRONAL ® A380 (% by dry weight) | — | — | — | — | — | — | — | — | — | — | — | — | 15 | — |
| VINNAPAS ® EP34 (% by dry weight) | — | — | 15 | — | — | — | — | — | — | — | — | — | — | — |
| Natural latex (% by wet weight) | — | 58.8 | 30 | 39 | 38.68 | 30.34 | 30 | 30 | 30 | 30 | 15 | 15 | 30 | 15 |
| Water | 40 | 39.2 | 30 | 30 | 38.64 | 30.22 | 30 | 30 | 30 | 30 | 30 | 30 | 30 | 30 |
| $CaCO_3$ 12 μm | — | — | — | — | — | 21.7 | — | 5.32 | 10.75 | 16.18 | — | — | — | — |
| $CaCO_3$ 350 μm | — | — | 21.5 | 21.5 | — | — | 21.5 | 16.18 | 10.75 | 5.32 | 21.5 | — | 21.5 | 21.5 |
| SBLS sand 120 μm | — | — | — | — | — | — | — | — | — | — | — | 21.5 | — | — |
| Apparent density of the fillers | — | — | 1.7 | 1.7 | — | 1.3 | 1.7 | 1.6 | 1.5 | 1.4 | 1.7 | 1.35 | 1.7 | 1.7 |
| Thickener: sodium polyacrylate aqueous solution | — | 2 | 1.37 | 1.37 | 1.6 | 1.13 | 1.37 | 1.37 | 1.37 | 1.37 | 1.37 | 1.37 | 1.37 | 1.37 |
| Biocide | — | — | 0.15 | 0.15 | 0.15 | 0.15 | 0.15 | 0.15 | 0.15 | 0.15 | 0.15 | 0.15 | 0.15 | 0.15 |
| Anti-foam agent | — | — | 0.2 | 0.2 | 0.2 | 0.2 | 0.2 | 0.2 | 0.2 | 0.2 | 0.2 | 0.2 | 0.2 | 0.2 |
| Stabilizer of the latex | — | — | 1.16 | 1.16 | 1.16 | 1.16 | 1.16 | 1.16 | 1.16 | 1.16 | 1.16 | 1.16 | 1.16 | 1.16 |
| Odor-masking agent | — | — | 0.1 | 0.1 | 0.1 | 0.1 | 0.1 | 0.1 | 0.1 | 0.1 | 0.1 | 0.1 | 0.1 | 0.1 |
| pH adjusting agent | — | — | 0.17 | 0.17 | 0.17 | — | 0.17 | 0.17 | 0.17 | 0.17 | 0.17 | 0.17 | 0.17 | 0.17 |
| Anti-oxidant | — | — | 0.35 | 0.35 | — | — | 0.35 | 0.35 | 0.35 | 0.35 | 0.35 | 0.35 | 0.35 | 0.35 |

TABLE 1bis

Compositions 10 to 15

| Composition (% by weight) | 10 | 11 | 12 | 13 | 14 | 15 |
|---|---|---|---|---|---|---|
| VINNAPAS ® EAF 68 (% by dry weight) | 11 | 12.5 | 9 | 4 | | |
| LUPHEN ® D DS 3548 (% by dry weight) | | | 5 | 10 | 14 | |
| VINNAPAS ® EP 8010 (% by dry weight) | | | | | | 15 |
| Natural latex (% by wet weight) | 29 | 30 | 30 | 30 | 30 | 30 |
| Water | 26 | 27.5 | 30 | 30 | 30 | 30 |
| CaCO₃ 350 μm | 21 | 21.15 | 20.85 | 20.85 | 20.85 | 21.5 |
| Granolite ® 150 N | 7.65 | 3.65 | | | | |
| Apparent density of the fillers | 1.7 | 1.7 | 1.7 | 1.7 | 1.7 | 1.7 |
| Thickener: aqueous solution of sodium polyacrylate | 1.02 | 1.37 | 1.37 | 1.37 | 1.6 | 1.37 |
| Biocide | 0.15 | 0.15 | 0.15 | 0.15 | 0.15 | 0.15 |
| Anti-foaming agent | 0.2 | 0.2 | 0.2 | 0.2 | 0.2 | 0.2 |
| Stabilizer with latex | 1.66 | 0.16 | 1.16 | 1.16 | 1.66 | 1.16 |
| Odor-masking agent | 0.1 | 0.1 | 0.1 | 0.1 | 0.1 | 0.1 |
| pH adjusting agent | 0.17 | 0.17 | 0.17 | 0.17 | 0.17 | 0.17 |
| Anti-oxidant | 0.35 | 0.35 | 0.35 | 0.35 | — | 0.35 |

Efficiency of the Adhesive Bonding and of the Detachment

The efficiencies of the adhesive bonding and detachment were evaluated by applying a peelable adhesive layer with a base weight of 360 g/m².

The efficiency of the adhesive bonding and of the detachment is evaluated on a substrate of the smoothing coating type with a coating of polyvinyl chloride (PVC), 7 days after being laid, the coating is manually removed and the force required for detaching the coating and the facility of detaching the adhesive film are evaluated qualitatively.

The results are indicated in Tables 2 and 2bis.

TABLE 2

Efficiency of adhesive bonding and of the detachment

| | A | B | C | D | 1 | 2 | 3 | 4 | 5 | 6 |
|---|---|---|---|---|---|---|---|---|---|---|
| Efficiency of the bonding | good | does not adhere | excellent | does not adhere | good | good | good | good | good | excellent |
| Efficiency of the detachment | non-detachable | very good | Non-detachable | excellent | good | excellent | good | good | good | medium |

TABLE 2bis

Efficiency of the adhesive bonding and of the detachment

| | 7 | 8 | 9 | 10 | 11 | 12 | 13 | 14 | 15 |
|---|---|---|---|---|---|---|---|---|---|
| Efficiency of the bonding | medium | excellent | medium | good | good | good | good | excellent | good |
| Efficiency of the detachment | good | medium | medium | good | excellent | excellent | good | Medium | good |

The comparative compositions A, B, C and D do not have together capabilities of adhesive bonding and detachment.

The compositions 1 to 15 according to the invention have together capabilities of adhesive bonding and detachment.

Peeling Force

The peeling force required for initiating the removal of the PVC coating bound by the peelable adhesive layer to a substrate consisting of a fiber-cement plate, is measured. The standard NF EN 1372 (peeling at 90°) is applied with a specimen of 250×50 mm, a peeling rate of 100 mm/min, and conditioning for 7 days at 23° C./50% RH.

The peeling force allows quantitative determination of the efficiency of the adhesive bonding.

The results are shown in Table 3 and 3bis.

Shearing Resistance of a Stuck Coating

The shearing resistance of a coating stuck on a fiber-cement plate is now determined. It is proceeded according to the standard NF EN 1373 (a specimen of 60×50 mm, a traction rate of 20 mm/min, and conditioning for 7 days at 23° C./50% RH), with an application of 360 g/m² of peelable adhesive. A homogeneous PVC Taraflex surface is used.

The shearing resistance of a stuck coating allows quantitative determination of the efficiency of the adhesive bonding.

The results are shown in Table 3 and 3bis.

TABLE 3

Peeling force and shearing resistance of the compositions

| | C | D | 1 | 2 | 3 | 4 | 5 | 6 |
|---|---|---|---|---|---|---|---|---|
| Peeling force (N/mm) | 1.12 | 0.31 | 1 | 0.99 | 0.99 | 0.96 | 1.01 | 1.76 |
| Shearing resistance (N/mm²) | 0.28 | 0.25 | 0.41 | 0.34 | 0.34 | 0.43 | 0.4 | 0.35 |

TABLE 3bis

Peeling force and shearing resistance of the compositions

|  | 7 | 8 | 9 | 10 | 11 | 12 | 13 | 14 | 15 |
|---|---|---|---|---|---|---|---|---|---|
| Peeling force (N/mm) | 0.67 | 1.41 | 0.67 | 0.88 | 0.83 | 0.81 | 0.92 | 1.02 | 0.76 |
| Shearing resistance (N/mm$^2$) | 0.39 | 0.37 | 0.33 | 0.34 | 0.31 | 0.35 | 0.43 | 0.54 | 0.31 |

Characterization of the Adhesive

The characteristics of the adhesive are measured. The standard NF ISO 37 is applied. The length of the sample is 70 mm and the width 6 mm, the film has a thickness ranging from 0.5 mm to 0.7 mm, the traction rate is 50 mm/min.

The results are shown in Tables 4 and 4bis wherein Rm represents the rupture stress and the modulus is the elastic modulus.

TABLE 4

Characterization of the adhesive

|  | C | D | 2 | 3 | 4 | 5 | 6 |
|---|---|---|---|---|---|---|---|
| Rm (N/mm) | 0.68 | 0.39 | 1.03 | 0.7 | 0.88 | 0.85 | 0.29 |
| Elongation at break (%) | 900 | 1050 | 2500 | 2100 | 2250 | 2200 | 1750 |
| Modulus (N/mm$^2$) | 0.83 | 0.42 | 0.4 | 0.2 | 0.25 | 0.28 | 0.3 |

TABLE 4bis

Characterization of the adhesive

|  | 7 | 8 | 9 | 10 | 11 | 12 | 13 | 14 | 15 |
|---|---|---|---|---|---|---|---|---|---|
| Rm (N/mm) | 0.92 | 0.78 | 0.59 | 0.71 | 0.79 | 0.83 | 1.12 | 3.42 | 0.76 |
| Elongation at break (%) | 2260 | 1950 | 1605 | 2250 | 2200 | 2250 | 2280 | 1800 | 2060 |
| Modulus (N/mm$^2$) | 0.33 | 0.46 | 0.19 | 0.3 | 0.33 | 0.43 | 0.52 | 2.97 | 0.31 |

Effect of the Thickness of the Dry Film and of the Filler

TABLE 5

Effect of the thickness of the dry film and of the filler

|  | E | 2 | 4 |
|---|---|---|---|
| CaCO$_3$ 12 µm | 0 | 0 | 10.75% |
| CaCO$_3$ 350 µm | 0 | 21.5% | 10.75% |
| Thickness of the dry film | 50 µm | 226 µm | 173 µm |
| Efficiency of the peeling | medium | excellent | good |

Table 5 shows the effect of the thickness of the dry film on the efficiency of the peeling. Indeed, a larger thickness allows improvement in the efficiency of the peeling (Examples 2 and 4).

Table 5 also shows the effect of the fillers on the efficiency of the peeling. Indeed, the fillers allow an increase in the thickness of the dry film and therefore in the efficiency of the peeling (Example E as compared with Examples 2 and 4).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 1162448, filed 26 Dec. 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for applying a flexible surface coating on a substrate consisting of the successive steps:
    a) applying a peelable adhesive composition layer on a surface of the substrate, b) drying the peelable adhesive composition to obtain a membrane,
c) applying a second adhesive composition, onto the membrane,
d) observing a gumming time ranging from 10 to 30 minutes,
e) displaying the flexible coating on the substrate by contacting the flexible surface coating with the adhesive layer on the surface of the substrate,
wherein said peelable adhesive composition comprises:
  i) from 10% to 40% by weight of at least one natural latex,
  ii) from 10% to 40% by weight of dry material based on the total weight of the adhesive composition, of at least one polymeric composition having a glass transition temperature ranging from −50° C. to 0° C., said polymeric composition comprising:
    (1) a terpolymer of vinyl acetate, of ethylene and of acrylate and a mixture of polyester and polyurethane, and/or
    (2) a terpolymer of vinyl acetate, of ethylene and of acrylate,
  iii) from 10% to 40% by weight based on the total weight of the adhesive composition, of at least one filler having an apparent density ranging from 1.30 to 1.70,
said substrate being capable of being recovered without any adhesive residues after removal of the peelable film or membrane obtained after drying of the peelable adhesive composition.

2. The method for applying a surface coating according to claim 1, wherein the amount of applied peelable adhesive composition is greater than or equal to 200 g/m².

3. The method of claim 1, wherein:
i) the natural latex represents from 15% to 35% by weight of the total weight of the adhesive composition and/or
ii) the polymeric composition represents from 10% to 25% by weight of dry material based on the total weight of the adhesive composition, and/or
iii) the filler(s) represent(s) from 15% to 35% by weight of the total weight of the composition.

4. The method of claim 1, wherein the peelable adhesive composition further comprises up to 10% by weight of a tackifying resin.

5. The method of claim 1, wherein the polymeric composition has a glass transition temperature ranging from −40° C. to −10° C.

6. The method of claim 1, wherein the peelable adhesive composition further comprises fibers.

7. The method of claim 1 wherein the amount of peelable applied adhesive composition is greater than or equal to 250 g/m².

8. The method of claim 1 wherein the amount of peelable applied adhesive composition is greater than or equal to 300 g/m².

9. The method of claim 1 wherein the amount of peelable applied adhesive composition is greater than or equal to 350 g/m².

10. The method of claim 3 wherein tackifying resin is rosin esters, terpene resins, terpene phenol resins or dispersions based on terpene phenol resin.

11. The method of claim 4 wherein the polymeric composition has a glass transition temperature ranging from −37° C. to −15° C.

12. The method of claim 5 wherein fibers are cellulose fibers, glass fibers, rubber fibers, natural fibers, viscose, jute, sisal or synthetic fibers.

13. The method of claim 1, wherein the substrate is selected from surfaced concretes, cement-based screeds, anhydrite screeds, old tilings, old suitably smoothed parquet flooring, particle panels or plywoods, standard wall claddings.

* * * * *